UNITED STATES PATENT OFFICE.

ERNEST FRANCIS EHRHARDT AND HERBERT WILFRID EHRHARDT, OF EDGBASTON, BIRMINGHAM, ENGLAND.

AZO DYE AND PROCESS OF MAKING.

1,281,243.   Specification of Letters Patent.   Patented Oct. 8, 1918.

No Drawing.   Application filed January 4, 1918. Serial No. 210,320.

*To all whom it may concern:*

Be it known that we, ERNEST FRANCIS EHRHARDT, B. Sc., D. Sc., Ph. D., and HERBERT WILFRID EHRHARDT, M. A., B. Sc., both subjects of the King of Great Britain, residing at 409 Gillott road, Edgbaston, Birmingham, England, have invented a new and useful Azo Dye and Process of Making, of which the following is a specification.
The specification of British Letters Patent No. 3698 A. D. 1877 granted to Peter Griess for the manufacture of azo coloring matters describes, among other things, the production of coloring matter by the combination of diazotized picramic acid with cresol from coal-tar oil, the said coloring matter dyeing unmordanted wool yellow-brown. The said coloring matter was prepared by the combination of the diazotized picramic acid with the cresol in caustic soda solution, and precipitating the coloring matter by means of hydrochloric acid.

The cresol from coal tar oil is now sold as cresylic acid, or pale liquid carbolic acid, and consists principally of a mixture of ortho-, meta-, and para-, cresol with some cre-naphthalene and other bodies. Of the cresols the para-cresol is the one which is always present in the smallest quantity. Even when the ortho-cresol has been separated from the mixture of cresols by distillation, the resulting mixture of meta-, and para-, cresol usually contains about 60 per cent. of the meta-cresol and 40 per cent. of the para-cresol.

The ortho-, and meta-, cresols form para-azo compounds when combined with diazo compounds and combine far more readily than does the para-cresol which gives rise to ortho-azo-coloring matters.

The coloring matter known as "metachrome brown Y" has recently been prepared by combining diazotized picramic acid with pale liquid carbolic acid, taking however considerably more than the theoretical quantity of the cresols and other bodies, constituting the said pale liquid carbolic acid, only part of the cresols employed combining with the diazotized picramic acid to form the azo coloring matter.

The coloring matter so obtained dyes unmordanted wool from the acid bath the yellow-brown color described in the aforesaid specification of Letters Patent 3698 A. D. 1877.

Upon experimenting with the effluent from this manufacture of "metachrome brown Y" we have found that new coloring matter can be obtained therefrom by treating the said effluent with diazotized picramic acid which coloring mater dyes shades different from the shade obtained from the "metachrome brown Y," the difference being most pronounced when both the coloring matters are dyed, in any suitable way, on a chrome mordant; for example, by the metachrome, or the after-chrome, process, the color obtained by the treatment of the effluent giving a much darker shade, than the yellow-brown, obtained from "metachrome brown Y" and the dyeings being fast against scouring and milling, the shade obtained from our new dyes thus dyed being usually an olive-brown.

The possibility of thus obtaining new coloring matters from the said effluent, and the fact that this contains uncombined para-cresol, has led us to make further experiments with commercially pure cresols and we have found that the said darker coloring matter, which, when pure, dyes a chocolate brown on unmordanted wool and olive brown on a chrome mordant, results from the combination of the diazotized picramic acid with para-cresol and is a new coloring matter of great value for dyeing wool, the shades produced being fast against scouring, milling and light.

The new coloring matter can therefore be obtained according to our invention by treating with diazotized picramic acid not only liquor such as is obtained after partial combination of a diazo compound with the mixture of cresols and which has hitherto been run to waste, but also generally by combining diazotized picramic acid with para-cresol itself.

The following examples will serve to show how our invention may be performed, but we do not limit ourselves to these examples. The parts are by weight.

*Example 1.—Production of the new coloring matter by fractional combination.*

Dissolve about 27½ parts of meta-para-cresol (that is a mixture of cresols containing about 60 per cent. of meta-cresol and 40 per cent. of para-cresol) in about 500 parts of water, and 40½ parts caustic soda solution of 70° Twaddell and cool this with ice to between zero and 5° centigrade. In a separate vessel diazotize a paste of picramic acid, which is ascertained, by titration, to be the equivalent of about 11.4 parts of sodium nitrite, with that quantity of nitrite, using about 74.1 parts of hydrochloric acid of 1.14 specific gravity. When the diazotization is complete cool the diazo solution to between zero and 5° centigrade add to it 16 parts of soda and 28⅓ parts of caustic soda solution 70° Twaddell and run it into the solution of meta-para-cresol and stir the mixture thoroughly until combination is complete, then filter, so as to obtain the aforesaid "metachrome brown Y" coloring matter. Collect the mother liquor, or effluent, and diazotize separately an amount of picramic acid equivalent to the quantity of cresol contained in the said mother-liquor, or effluent. This will usually be the equivalent of about 3½ parts of sodium nitrite. Cool the diazo solution to between zero and 5° centigrade, add six parts of soda and run this cold diazo solution into the cooled mother liquor, or effluent, obtained as aforesaid. Stir thoroughly until the combination is complete. Collect the new coloring matter by filtration and bring it to a standard strength of paste by stirring with water.

The "metachrome brown Y" coloring matter first obtained dyes unmordanted wool a bright yellow-brown and dyes chrome mordanted wool a duller yellow-brown. The second coloring matter obtained by treating the mother liquor, or effluent, as aforesaid is our new coloring matter in a fair state of purity and dyes unmordanted wool chocolate-brown, and, with a chrome mordant, gives an olive-brown color, fast to milling and light.

In the foregoing example it is, after the first combination, desirable to test a portion of the mother-liquor, or filtrate, by combining a small quantity of it with the equivalent quantity of diazotized picramic acid, and make a test dyeing to see whether the combination with the meta-cresol and any ortho-cresol present has proceeded sufficiently far, and if not, to conduct a further fractional combination to remove this excess of ortho-, or meta-, cresol. The diazotizations and combinations should be effected with great care so that the end product is not contaminated with the decomposition products of the diazo compound.

The method of working described in the foregoing example can be varied as follows:—After the first combination by treatment of the mixture of cresols with diazotized picramic acid and, before filtering, the combination liquor is acidified so that the coloring matter formed is obtained in the form of its free acid, which is practically insoluble in water and the uncombined cresol is set free. The liquid is brought to the boil and then filtered; the effluent is cooled and returned to a combining tub, or like vessel, and made alkaline and combined with the second quantity of diazotized picramic acid to obtain the new coloring matter.

*Example 2.—Production of the new coloring matter from isolated para-cresol.*

Diazotize the quantity of picramic acid ascertained by titration to be the equivalent of 48 parts sodium nitrite with that quantity of nitrite using about 3300 parts of water for the diazo solution and about 128 parts of sulfuric acid containing about 90 per cent. $H_2SO_4$ for diazotizing. Run the diazo solution into an ice cold solution of 75 parts of para-cresol in 3000 parts of water, 87 parts caustic soda solution 74° Twaddell and 140 parts of soda. Stir thoroughly until the combination is complete, filter, collect, by filtration, the new coloring matter and mix it with water to a standard strength of paste.

What we claim is:—

1. The manufacture of ortho-azo coloring matter by combining diazotized picramic acid with the effluent from the fractional combination of diazotized picramic acid with a mixture of cresols, stirring till combination is complete, then filtering and bringing the coloring matter so obtained to a paste by stirring with water.

2. The manufacture of ortho-azo coloring matter by acidifying a combination liquor of a mixture of cresols with diaotized picramic acid, boiling and filtering the product, cooling the effluent and rendering it alkaline and combining with it a further quantity of diazotized picramic acid.

3. The manufacture of ortho-azo coloring matter by combining diazotized picramic acid with para-cresol.

4. The manufacture of ortho-azo coloring matter by combining diazotized picramic acid with para-cresol, stirring until combination is complete, then filtering and mixing the obtained coloring matter with water to bring it to the condition of paste.

5. As a new article of manufacture, coloring matter which dyes unmordanted wool from the acid bath giving chocolate-brown shades and which dyes wool with chrome mordant giving olive-brown shades fast to scouring milling and light, which coloring matter can be obtained by combining diazotized picramic acid with para-cresol.

In testimony whereof we have signed our names to this specification in the presence of two subscribing witnesses.

ERNEST FRANCIS EHRHARDT.
HERBERT WILFRID EHRHARDT.

Witnesses:
EDWARD CRAVEN,
RICHARD B. PENROSE.

Copies of this patent may be obtained for five cents each, by addressing the "Commissioner of Patents, Washington, D. C."